US012602509B2

(12) United States Patent
Chen et al.

(10) Patent No.: US 12,602,509 B2
(45) Date of Patent: Apr. 14, 2026

(54) RESTRICTING MEDIA ACCESS BY CONTACT CENTER AGENTS DURING A USER VERIFICATION PROCESS

(71) Applicant: Zoom Communications, Inc., San Jose, CA (US)

(72) Inventors: Jiawei Chen, Kirkland, WA (US); Peng Su, Shoreline, WA (US)

(73) Assignee: Zoom Communications, Inc., San Jose, CA (US)

( * ) Notice: Subject to any disclaimer, the term of this patent is extended or adjusted under 35 U.S.C. 154(b) by 397 days.

(21) Appl. No.: 17/670,471

(22) Filed: Feb. 13, 2022

(65) Prior Publication Data

US 2023/0259651 A1      Aug. 17, 2023

(51) Int. Cl.
*G06F 21/62*        (2013.01)
*G06F 21/60*        (2013.01)
*H04M 3/51*        (2006.01)

(52) U.S. Cl.
CPC ........ *G06F 21/6245* (2013.01); *G06F 21/604* (2013.01); *H04M 3/5183* (2013.01)

(58) Field of Classification Search
CPC ............... G06F 21/6245; G06F 21/604; G06F 3/04817; G06F 3/04847; G06F 21/32; G06F 3/04883; G06F 3/011; G06F 3/04842; G06F 3/0488; G06F 3/0482; G06F 3/04845; G06F 16/2365; G06F 16/2379; G06F 16/285; G06F 21/316; G06F 3/0486; G06F 30/20; G06F 40/186; G06F 3/0481; G06F 3/017; G06F 3/04886; G06F 40/279; G06F 16/71; G06F 3/016; G06F 11/3072; G06F 21/31;

G06F 21/36; G06F 2221/2149; G06F 3/0485; G06F 16/41; G06F 16/61; G06F 16/3329; G06F 16/5854; G06F 16/637; G06F 21/34; G06F 21/42; G06F 3/167; G06F 16/29; G06F 2221/2111;

(Continued)

(56) References Cited

U.S. PATENT DOCUMENTS 8,275,115 B1      9/2012  Everingham et al.
10,956,605 B1    3/2021  Brown et al.
(Continued)

FOREIGN PATENT DOCUMENTS

EP          3430793 A1      1/2019

OTHER PUBLICATIONS

International Search Report and Written Opinion mailed on Jun. 1, 2023 in corresponding PCT Application No. PCT/US2023/012566.
(Continued)

*Primary Examiner* — Djenane M Bayard
(74) *Attorney, Agent, or Firm* — Young Basile Hanlon & MacFarlane, P.C.

(57)          ABSTRACT

A contact center server enables a contact center engagement between a device of a contact center agent and a device of a contact center user. At some point during the contact center engagement, the contact center server restricts access by the device of the contact center agent to media from the device of the contact center user based on a request prompted to the contact center user during the contact center engagement. The contact center server reenables the access based on a verification of information obtained from the device of the contact center user responsive to the request.

20 Claims, 8 Drawing Sheets

(58) Field of Classification Search

CPC ........ G06F 16/954; G06F 3/012; G06F 3/013;
G06F 18/24133; G06F 18/254; G06F
1/1605; G06F 1/1616; G06F 1/1643;
G06F 1/1686; G06F 1/1688; G06F
1/3231; G06F 16/40; G06F 16/739; G06F
21/606; G06F 21/6254; G06F 21/83;
G06F 3/0304; G06F 3/0346; G06F 40/35;
G06F 16/532; G06F 40/40; G06F 16/951;
G06F 40/30; G06F 16/258; G06F 21/602;
G06F 21/6227; G06F 21/78; G06F 9/547;
G06F 16/958; G06F 8/61; G06F
16/90332; G06F 3/0484; G06F 40/284;
G06F 18/2155; G06F 18/24; G06F
18/295; H04M 3/5183; H04M 2203/6009;
H04M 2203/6027; H04M 3/51; H04M
3/5116; H04M 3/436; H04M 2250/12;
H04M 3/5166; H04M 3/5175; H04M
3/5191; H04M 3/42059; H04M 2201/40;
H04M 3/523; H04M 3/5237; H04M
3/5232; H04M 3/42042; H04M 2203/256;
H04M 3/5133; H04M 2203/402; H04L
51/214; H04L 63/0227; H04L 67/02;
H04L 67/55; H04L 51/216; H04L 12/18;
H04L 51/046; H04L 51/066; H04L 51/48;
H04L 51/52; H04L 63/061; H04L 67/10;
H04L 67/104; H04L 67/1074; H04L
67/306; H04L 67/34; H04L 67/535; H04L
63/062; H04L 63/08; H04L 63/0869;
H04L 63/0876; H04L 63/18; H04L
9/0894; H04L 63/0428; H04L 63/0838;
H04L 63/12; H04L 9/08; H04L 9/0819;
H04L 9/085; H04L 9/0861; H04L 9/0866;
H04L 9/14; H04L 41/046; H04L 41/28;
H04L 51/04; H04L 63/0435; H04L 9/40;
H04L 63/126; H04L 63/1416; H04L
63/1425; H04L 12/2809; H04L 12/2818;
H04L 2012/2841; H04L 2012/2843;
H04L 67/025; H04L 41/22; H04L
63/0861; H04L 12/2823; H04L 12/283;
H04L 43/045; H04L 65/403; H04L
12/1822; H04L 65/1069; H04L 12/1827;
H04L 65/1089; H04L 12/1818; H04L
12/1831; H04L 65/1093; H04L 65/4015;
H04L 69/22; H04L 65/61; H04L 65/70
See application file for complete search history.

(56) References Cited

U.S. PATENT DOCUMENTS

| | | | | |
|---|---|---|---|---|
| 11,356,259 | B1 * | 6/2022 | Agnew | H04L 9/3271 |
| 2007/0206765 | A1 * | 9/2007 | Shaffer | H04M 3/5183 |
| | | | | 379/265.01 |
| 2009/0161843 | A1 * | 6/2009 | Sylvain | H04L 65/1069 |
| | | | | 379/93.09 |
| 2013/0136242 | A1 | 5/2013 | Ross et al. | |
| 2014/0146959 | A1 * | 5/2014 | Spence | H04M 3/5183 |
| | | | | 379/265.09 |
| 2016/0034717 | A1 * | 2/2016 | Keohane | G06F 21/6254 |
| | | | | 726/1 |
| 2016/0227284 | A1 * | 8/2016 | Ordille | H04N 21/4788 |
| 2018/0167505 | A1 * | 6/2018 | Bird | H04M 3/5175 |
| 2018/0309801 | A1 * | 10/2018 | Rathod | H04M 3/5175 |
| 2019/0138748 | A1 * | 5/2019 | Long | H04N 7/183 |
| 2019/0191031 | A1 * | 6/2019 | O'Connor | H04M 3/5141 |
| 2020/0396331 | A1 * | 12/2020 | Gupta | H04L 63/18 |
| 2022/0121776 | A1 * | 4/2022 | Johnston | G06F 21/554 |
| 2023/0089720 | A1 * | 3/2023 | Whitaker | G08B 21/02 |
| | | | | 340/539.13 |

OTHER PUBLICATIONS

How Agent Exposure To Customer Data Is Putting Contact Centers
At Rick, Tim Critchley, https://www.icmi.come/resources/2017/how-
agent-exposure-to-customer-data-is-putting-contact-centers-at-
risk., Dec. 6, 2017, 7 pages.

Protecting Personal Inforamtion, A Guide for Business, Federal
Trade Commission, business.ftc.gov, Oct. 2016, 36 pages.

Top 10 Call Center Compliance Issues (With Useful Tips), https://
biz30.timedoctor.com/call-center-compliance-issues/, Jan. 2022, 17
pages.

Call Center Management Featured Article, 5 Call Center Security
Tips For Protecting Customer Data and Preventing Breaches, Mia
Papanicolaou, https://www.tmcnet.com/channels/call-center-
management/articles/419851-5-call-center-security-tips-protecting-
customer-data.htm, Apr. 6, 2016, 8 pages.

* cited by examiner

700A

702

704

VERIFY
INFO

706

CALL
MANAGER

700B

SELECT INFO TO
VERIFY

708

DRIVER'S
LICENSE

710

SOCIAL
SECURITY
NUMBER

712

HEALTH ID
NUMBER

800

802

ENABLE A CONTACT CENTER ENGAGEMENT BETWEEN A DEVICE OF A CONTACT CENTER AGENT AND A DEVICE OF A CONTACT CENTER USER

804

RECEIVE AN INFORMATION VERIFICATION REQUEST

806

RESTRICT ACCESS BY THE DEVICE OF THE CONTACT CENTER AGENT TO MEDIA FROM THE DEVICE OF THE CONTACT CENTER USER

808

VERIFY THE INFORMATION OF THE CONTACT CENTER USER

810

REENABLE THE ACCESS

RESTRICTING MEDIA ACCESS BY CONTACT CENTER AGENTS DURING A USER VERIFICATION PROCESS

FIELD

This disclosure generally relates to contact center engagement communication sessions. In particular, this disclosure relates to restricting media access by contact center agents during a user verification process.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
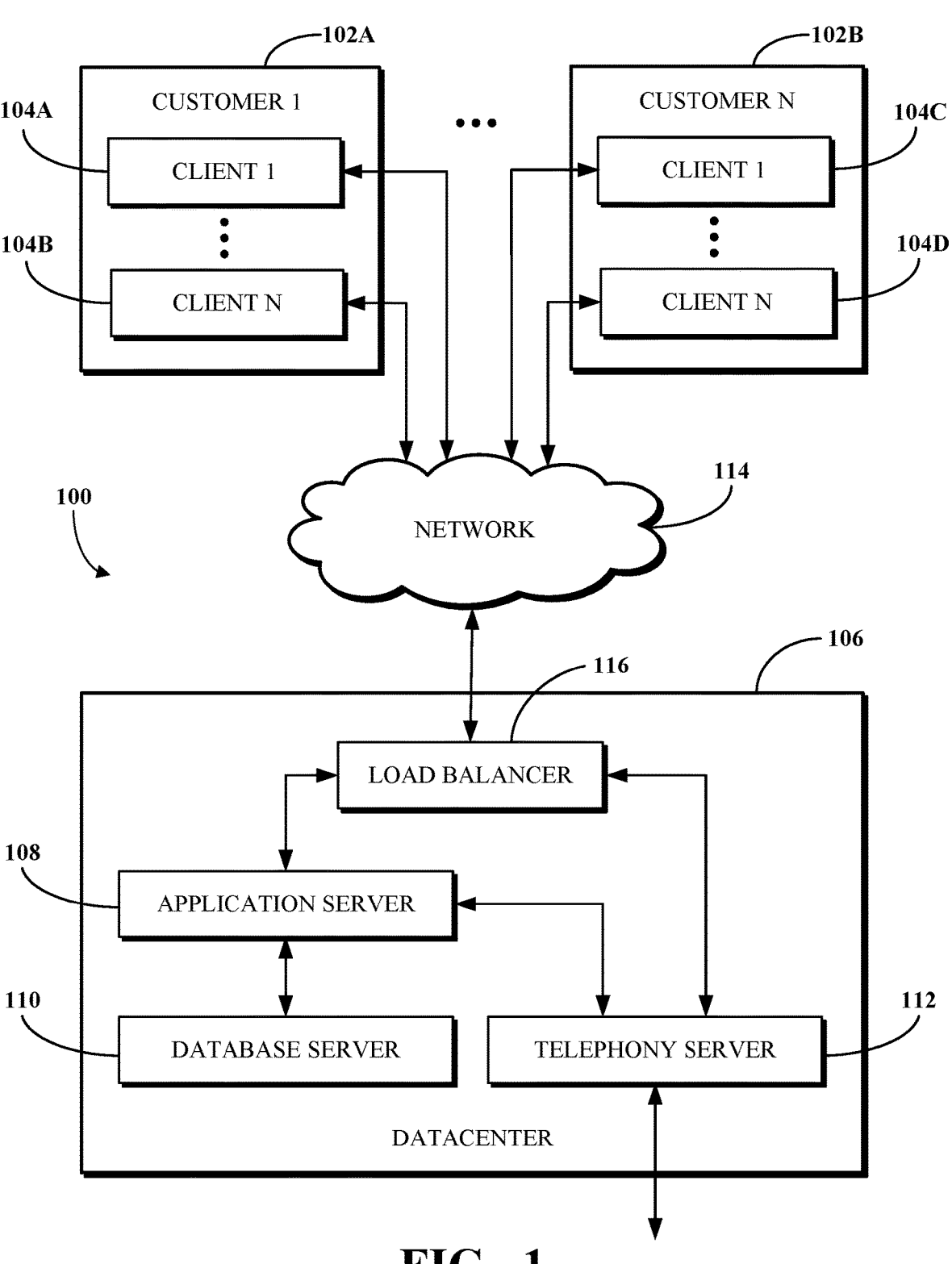
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

A user may initiate a contact center engagement (e.g., a voice or video call) with a contact center (e.g., of a business, government, organization or other entity) to have a conversation with a contact center agent for one or more reasons, for example, to open a bank account, seek technical support, or receive healthcare advice. During the contact center engagement, the contact center system, such as based on policies defined by or for an entity for which the contact center is operated, may need to verify sensitive information (e.g., information which may be subject to a privacy policy enforced for the contact center engagement or otherwise protectable under law as being sensitive information), such as a social security number, credit card number, healthcare insurance identifier, or bank account number of the user. In particular, the contact center system may require the verification of this sensitive information to allow the agent to further participate in the contact center engagement. However, for security reasons, it might not be desirable for the user to provide this information to the contact center agent.

One solution may be to have the user verify the information via an automated engine before being connected to the contact center agent. The automated engine may be implemented using speech-to-text or natural language processing technology. However, this approach suffers several drawbacks. First, this approach requires contact center users to remain in a queue for a longer period of time which reduces customer satisfaction for the contact center experience. Second, customer satisfaction may further suffer by this approach in that users may place a premium on being connected to a human contact center agent immediately or soon after initiating the communication session. Third, the information to be verified may be different in different contexts that are established by the contact center agent. For example, a user calling to apply for a new credit card might be asked to verify their social security number and addresses where they lived in the last five years, while a user calling to manage a credit card account might be asked to verify their credit card number and a recent transaction on the credit card. Determining which information is to be verified before connecting the user to the customer service agent may be challenging or error prone, such as due to the vast number of types of support requests that a contact center user may be reaching out to the contact center for and the infeasibility of a system to accurately predict subtle but important differences in such support requests based solely on the initial, high-level information presented by the contact center user while they remain in queue and await a contact center engagement with an agent.

Implementations of this disclosure address problems such as these by restricting access by devices of contact center agents to media from devices of contact center users during contact center engagements between the agents and the users and while verification processes are being performed for sensitive information of the users. A contact center engagement is enabled between a device of a contact center agent and a device of a contact center user. For example, the contact center user may dial a telephone number associated with the contact center and be connected to the contact center agent using cellular, landline, or Internet-based telephony technology. Alternatively, a user may place a video call on a video calling enabled device to a video calling line associated with the contact center and be connected to the contact center agent by video call. During the call, the contact center agent may determine that information of the user is to be verified. For example, if the user is attempting to open a bank account, the user's social security number may need to be verified. If the user is attempting to access their health records, the user's health insurance card number may need to be verified (or, in a video call, the user may present their health insurance card for verification via the camera). A contact center server may restrict access by the device of the contact center agent to media from the device of the contact center user while the information is being verified. For example, audio from the device of the contact center user may not be transmitted to the device of the contact center agent while the user is asked to verify their social security number. The verification process may include the contact center server playing, to the user, a recording saying, "Please state your social security number," and then using speech-to-text or natural language processing (NLP) to automatically process the user's response. After the user speaks their social security number and the social security number is verified by the contact center server, the contact center server reenables the access by the device of the contact center agent to media from the device of the contact center user, and the contact center user continues the session with the contact center agent.

Thus, according to implementations of this disclosure, the sensitive information of a contact center user may be verified by a contact center system without provision of the sensitive information to the contact center agent involved in an active engagement with the contact center user. This may increase the comfort level of the user in interacting with the contact center (as no person gets access to the user's information). Also, this may decrease liability risk of the contact center (e.g., in an event that the contact center agent inappropriately uses the user's information). Furthermore, this limits the amount of time a user must spend in queue awaiting an engagement with an agent and overcomes shortcomings associated with automated engines used before such engagements begin.

To describe some implementations in greater detail, reference is first made to examples of hardware and software structures used to implement a system for restricting media access by contact center agents during a user verification process. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a SIP zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
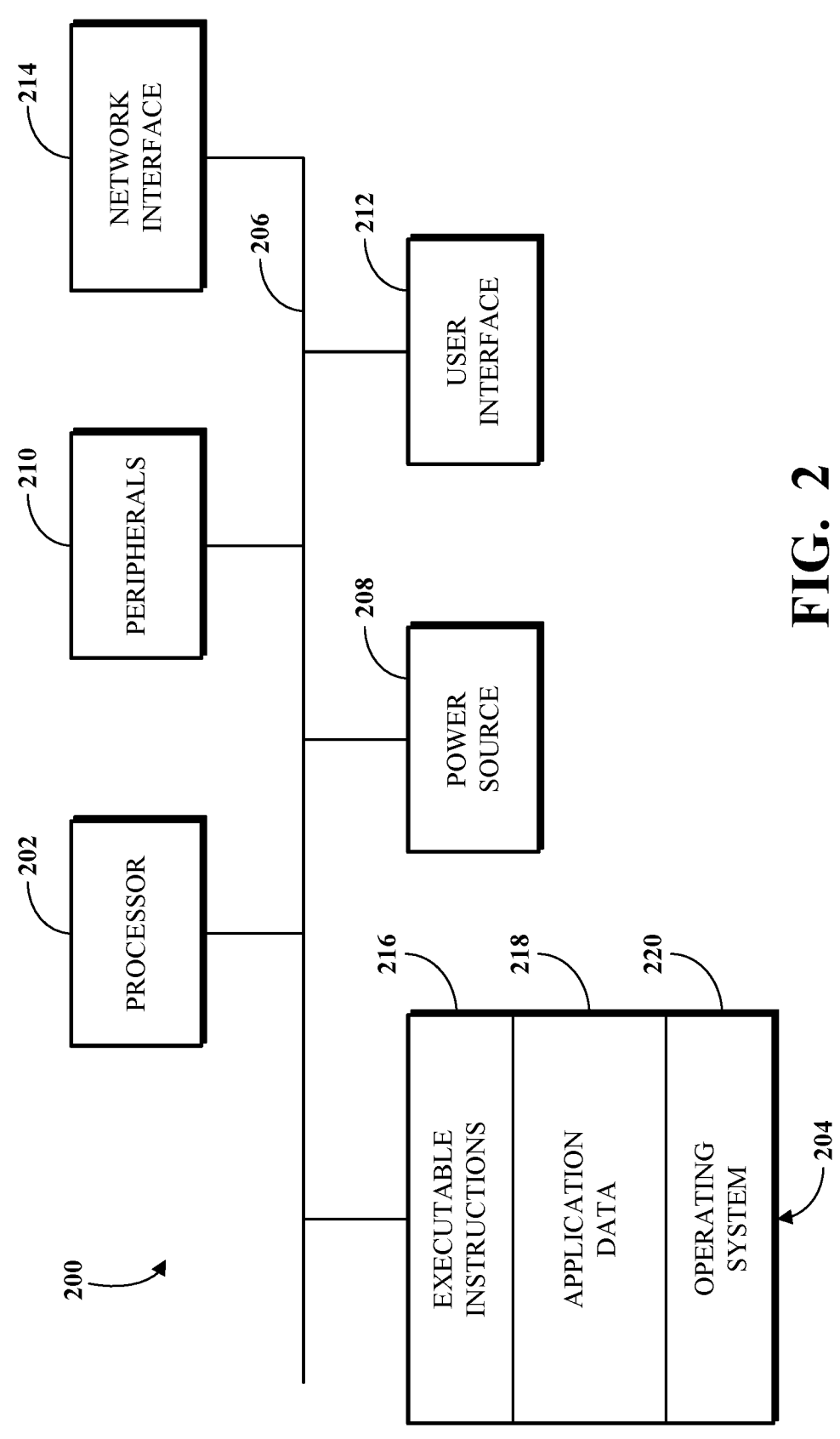
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
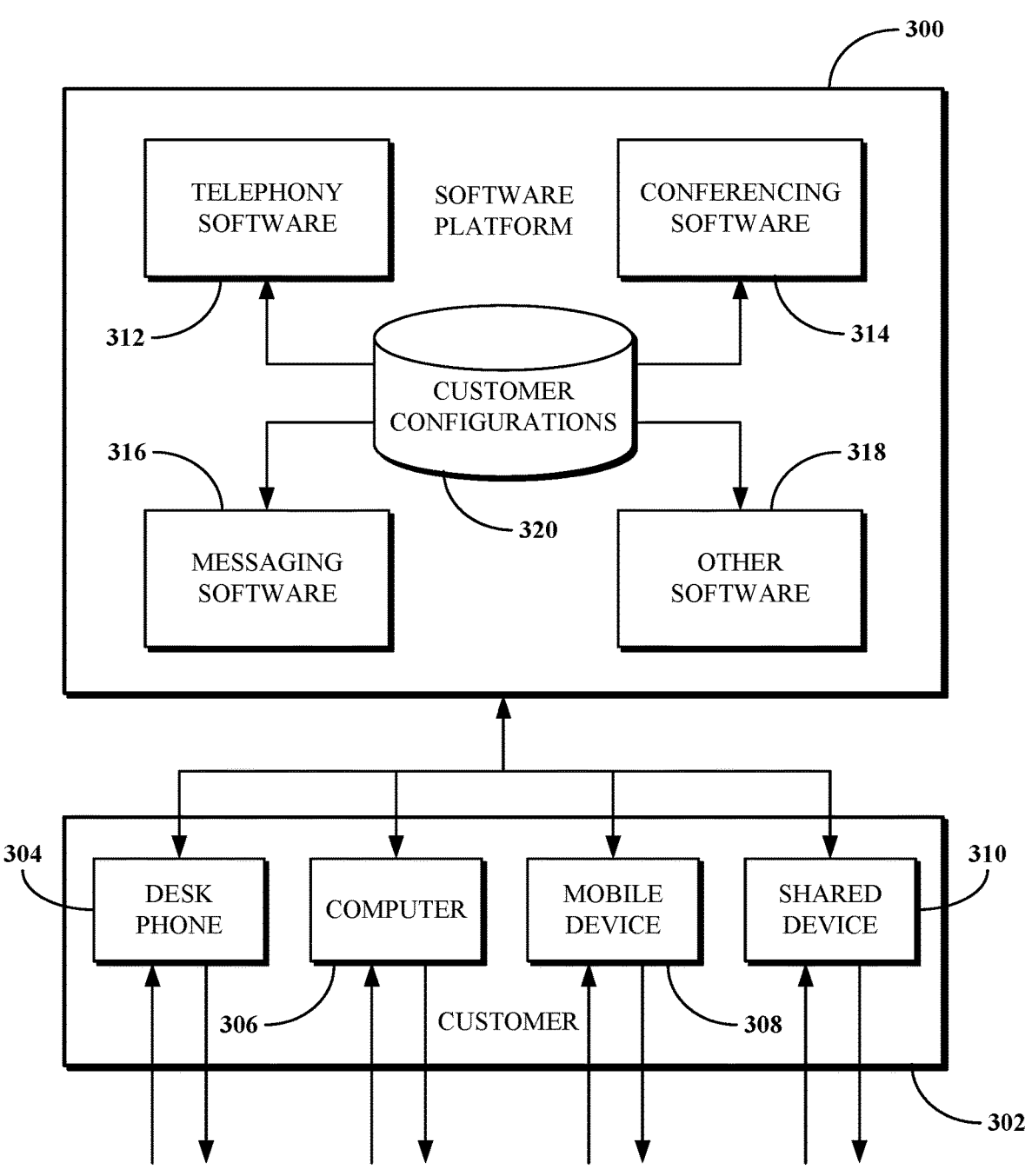
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for restricting media access by contact center agents during a user verification process.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
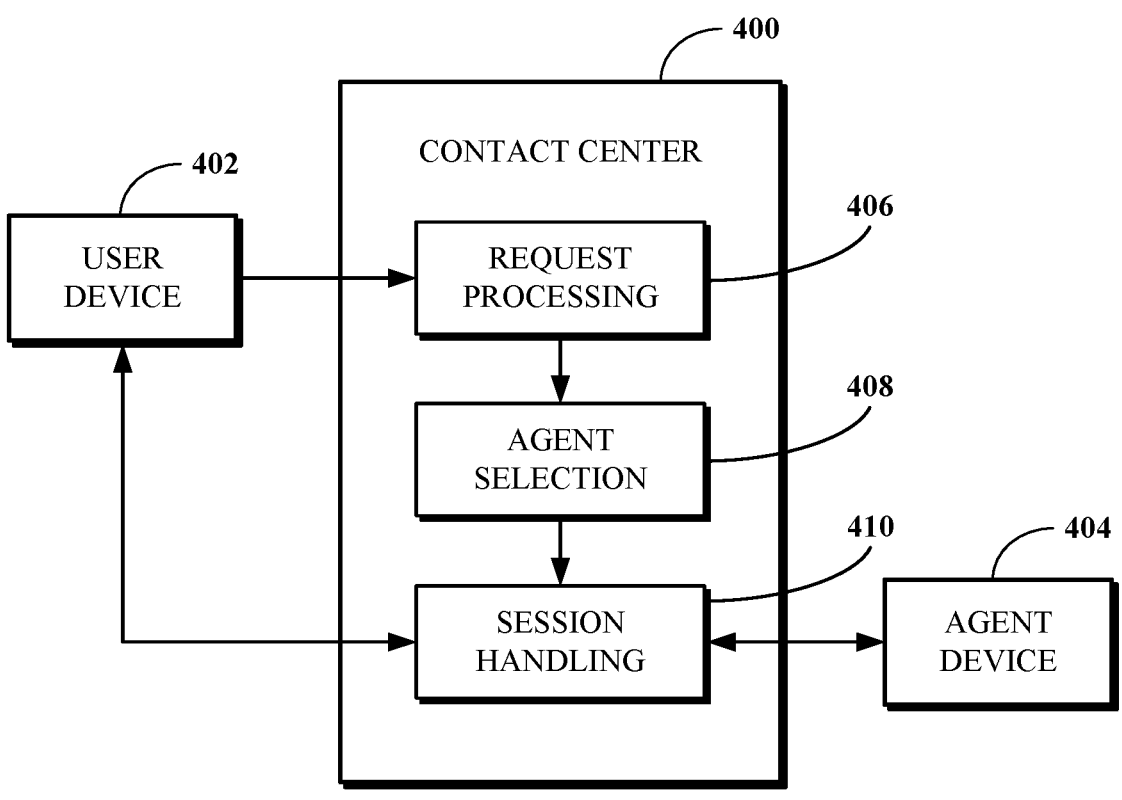
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device

404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or subcategory of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request via text and thereafter process the text entered by the user device 402 using natural language processing and/or other processing.

The agent selection software 408 uses output of the request processing software 406 including the information associated with the request to select a contact center agent to handle the request. The contact center agent may be a human agent or a non-human agent, for example, a chat bot or other bot. The agent selection software 408 may first determine an agent group associated with the category or sub-category of the purpose of the request (e.g., based on the information associated with the request). The agent selection software 408 may thereafter select an agent from that agent group based on one or more criteria, including agent skill set, agent availability, an agent selection policy (e.g., indicating to rotate in a particular way through a list of available agents), agent review scores, a combination thereof, or the like.

Generally, an agent may belong to one agent group and be able to facilitate requests over one modality. For example, a contact center agent may only be part of an agent group that handles information technology-related requests over the telephony modality. However, in some cases, a given agent may belong to multiple agent groups and/or be able to facilitate requests over one or more modalities. For example, a contact center agent may be part of a first agent group that handles accounting-related requests over all of the telephony, video, chat, and text modalities. In another example, a contact center agent may be part of a first agent group that handles accounting requests over the telephony modality and part of a second agent group that handles information technology-related requests over the video modality. Generally, the agent selected by the agent selection software 408 will automatically be assigned the contact center engagement with the user device 402. However, in some implementations, the agent selection software 408 instead may prompt the selected agent to accept the contact center engagement with the user device 402 before assigning that contact center engagement to the selected agent.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
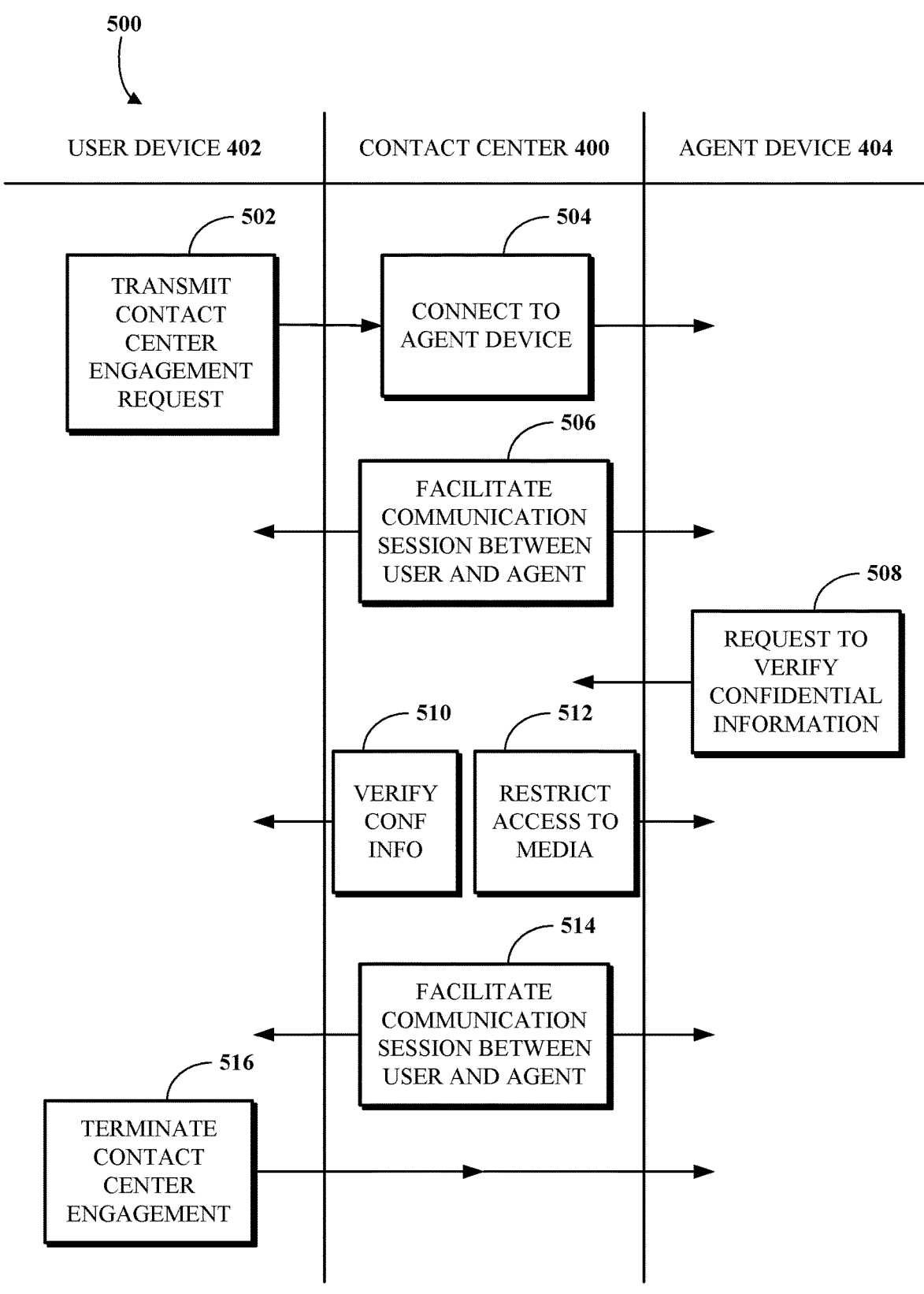
FIG. 5 is a data flow diagram of an example of restricting media access by contact center agents during a user verification process.

FIG. 5 is a data flow diagram 500 of an example of restricting media access by contact center agents during a user verification process. As shown, the data flow diagram 500 is implemented by the user device 402, the contact center 400, and the agent device 404 of FIG. 4. As described in conjunction with FIG. 5, the agent device 404 is operated by a human agent. However, as described above, the agent device 404 may be automatically operated without a human agent, such as where the contact center agent involved in the subject contact center engagement is a non-human agent.

At 502, the user device 402 initiates a contact center engagement request. For example, the user device 402 may be a telephone that dials a telephone number of the contact center 400. Alternatively, the user device 402 may be a computing device and may initiate at least one of a voice call, a video call, a text messaging session, a file sharing session, or a social media messaging session with the contact center 400.

At 504, based on the contact center engagement request from the user device 402, the contact center 400 connects the user device 402 to the agent device 404. The agent device 404 may be associated with a human agent and may be selected based on agent availability and/or based on an indication, from the user device 402, of the reason for the contact center engagement. For example, if the contact center 400 is associated with a bank, the contact center may include agents for opening new accounts and agents for handling existing accounts. That is, and as is described above, the user of the user device 402 may be asked to provide information (e.g., a category or sub-category associated with the reason for the contact center engagement request) usable for the contact center 400 to select an agent or agent group. For example, the contact center may present, to the user device, an IVR menu indicating to "Type or say 1 to open a new account or type or say 2 to manage your existing account." Alternatively, in a video calling implementation, a dropdown menu with the options "open a new account" or "manage your existing account" may be presented at the user device 402.

At 506, the contact center 400 initiates, as an active communication session, a contact center engagement between the user of the user device 402 and the agent at the agent device 404. The user and the agent may communicate using at least one of voice, video, text, and file sharing between the user device 402 and the agent device 404.

At a certain point during the contact center engagement, the agent at the agent device 404 may request to verify information of the user. The request to verify information of the user may be based on a question or request presented from the user to the agent. Alternatively, the request to verify information of the user may be based on a standard part of the contact center engagement process, such as before the agent provides support in connection with the reason for which the user initiated the contact center engagement request which led to the contact center engagement. In some implementations, the request may be automatically generated by software and/or hardware at the contact center 400, instead of by the agent device 404. For example, if the user indicates that they wish to open a new credit card account, the agent may request to verify the user's social security number to access the user's credit history report or credit score.

Accordingly, at 508, during the contact center engagement, the agent device 404 transmits, to the contact center

Figures 7A, 7B:
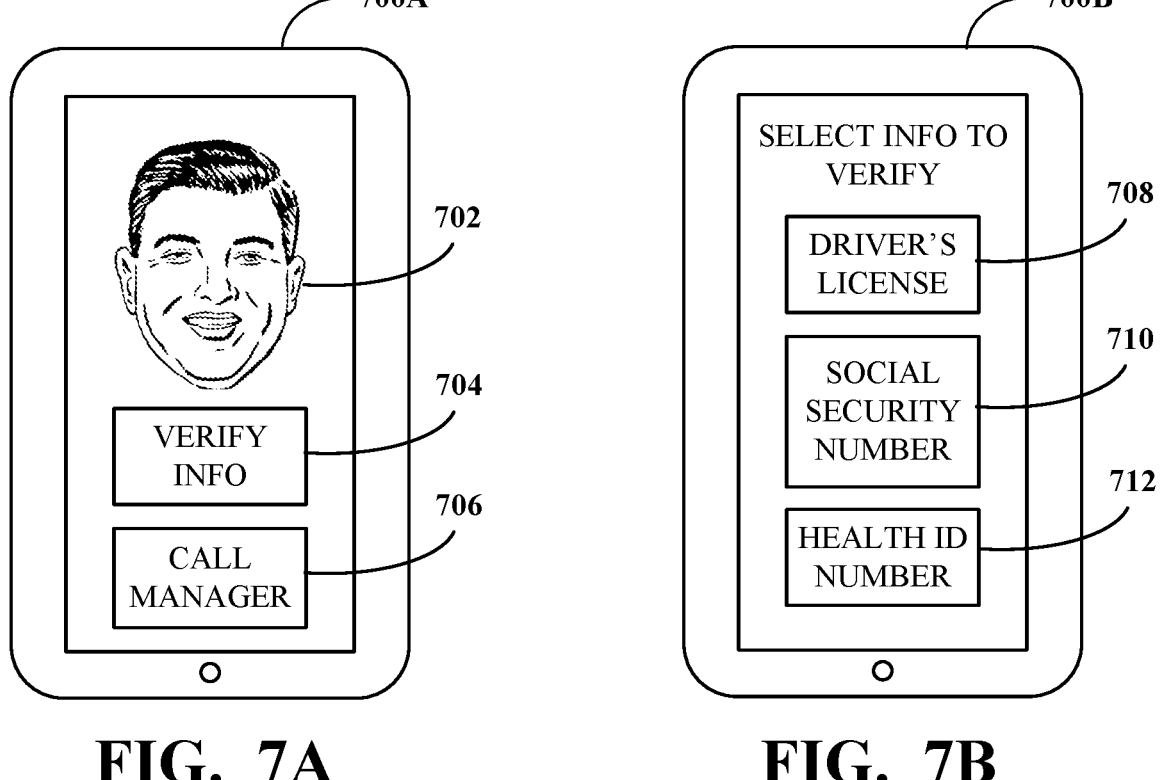
FIGS. 7A-B illustrate example graphical user interfaces for information verification.

400, a request to verify information. For example, the contact center agent using the agent device 404 may press a predefined button (or set of buttons) on a telephone keypad to prompt the verification of the information and to specify which information should be verified. Alternatively, the contact center agent may access a graphical user interface (e.g., as shown in FIGS. 7A-B) to prompt the verification of the information and to specify which information should be verified. In some alternative implementations, the request to verify the information may be generated automatically by the contact center 400. For example, the contact center may use speech-to-text to transcribe a conversation between the contact center user and the contact center agent and apply artificial intelligence to determine when certain information of the user is to be verified. For example, if the contact center user asks, "What is my account balance," the contact center 400 may automatically determine that the account number and the identity of the contact center user are to be verified before the contact center agent provides the account balance.

At 510, the contact center 400 verifies the information with the contact center user of the user device 402. For example, the contact center 400 may use speech-to-text or NLP to process information obtained from the user device 402 for verification purposes. In another example, the contact center 400 may ask the contact center user to hold their social security card in front of the camera of the user device 402 in order to scan the social security card and identify the social security number using optical character recognition (OCR) or artificial intelligence techniques.

As shown at 512, while performing 510, the contact center 400 restricts access by the agent device 404 to at least a part of media from the user device 402 during the information verification process. In some cases, the agent device 404 may be restricted from accessing all media from the user device 402 while the verification of the information is being performed. For example, the agent device 404 may be presented with a splash screen or like temporary media output while the contact center 400 obtains and processes the information from the user device 402. In other cases, the agent device 404 may be restricted from accessing some but not all media from the user device 402 while the verification of the information is being performed. For example, if the information is being verified by speech, the agent device 404 may be restricted from accessing an audio stream (but not a video stream) from the user device 402. If the information is being verified by scanning data via the camera of the user device 402, the agent device 404 may be restricted from accessing the video stream (but not the audio stream). Alternatively, the agent device 404 may be restricted from viewing the documents that are being scanned. To restrict the agent device 404 from viewing the documents that are being scanned, artificial intelligence techniques may be used to identify (and restrict the agent device 404 from accessing) documents (e.g., rectangular papers or plastic cards) that are being scanned into the camera of the user device 402. The space on the screen occupied by the documents may be blurred or greyed out in the visual output transmitted to the agent device 404. Accordingly, in at least some implementations, restricting the agent device 404 from accessing media from the user device 402 can include restricting access by the agent device 404 to a first type of media from the user device 402 based on the information to be obtained and processed from the user device 402 (e.g., based on a type or format of that information) while allowing access by the agent device 404 to a second type of media from the user device 402.

At 514, after the information is verified, access by the agent device 404 to media from the user device 402 is reenabled, such as by that previously-restricted media once again transmitted to the agent device 404. In some cases, as part of the reenabling process, the agent device 404 may receive a notification that the information was successfully verified. Alternatively, the agent device 404 may receive an indicator associated with the verified information. For example, after a contact center user who is applying for a credit card verifies their social security number, the agent device 404 may present, via its graphical user interface, at least one of the contact center user's credit score (which may be looked up in a database or other data store using the social security number but without that social security number being presented to the agent device 404), an indication, based on the credit score, of whether the user is approved for the credit card, or a credit history report of the contact center user for manual review (and approval or disapproval for the credit card) by the contact center agent.

At 516, after the contact center user has accomplished their goals in the contact center engagement, the contact center user, via the user device 402, terminates the contact center engagement. Alternatively, the contact center agent, via the agent device 404, may terminate the contact center engagement. Termination of the contact center engagement includes terminating a communication session opened to facilitate the contact center engagement, which may, for example, include disconnecting one or both of the user device 402 or the agent device 404 from the contact center system. For example, termination of the contact center engagement may include hanging up a telephone or otherwise ending the communication session.

In one example use case, a contact center user at the user device 402 initiates a contact center engagement by connecting to contact center 400. For example, the contact center user may dial a toll-free telephone number to connect to the contact center or the user may initiate a voice or video call with the contact center via a voice or video communication application. The contact center 400 connects the user device 402 to the agent device 404 of an available contact center agent, and initiates a communication session between the contact center user and the contact center agent.

During the contact center engagement, the contact center agent may provide an input (e.g., by selecting a button on a graphical user interface of the device of the contact center agent or dialing a predetermined entry into a telephone keypad) to request verification of information of the user. This may be done, for example, to confirm the identity of the user. The contact center agent may determine that information of the user is to be verified to confirm the user's identity or to verify that the user meets certain requirements (e.g., credit history or work authorization). The information may include, for example, a bank account number, a social security number, information stored in a credit report, or information stored in a medical record.

In response to the input from the agent device 404, the contact center 400 restricts access by the agent device 404 to media (e.g., audio and/or video) from the user device 402, such as by the contact center 400 foregoing the sharing of the media (from the user device 402 with the agent device 404. The user may optionally be notified (e.g., via audio or text or other visual information output in a graphical user interface for the communication session at the user device 402) that the agent is, temporarily, not receiving the media. For example, to restrict the media access by the agent device 404, the contact center 400 may cause the audio to be muted at the agent device 404 or cause the audio not to be transmitted to the agent device 404, such as by temporarily disconnecting the agent device 404 from one or more channels established for the contact center engagement session, by temporarily moving the user device 402 or the agent device 404 to a sub-session, or the like. In some cases, if the contact center engagement is a video call, a visual output may still be transmitted from the agent device 404 to the user device 402, and vice versa. Alternatively, the visual output from the device of the contact center user to the device of the contact center agent (or vice versa) may be disabled, for example, if the user is asked to produce an image of information (e.g., if the user is asked to hold their health insurance card in front of the camera of the user device 402).

While the contact center 400 foregoes sharing the media with the agent device 404, the contact center 400 uses an automated engine to prompt (e.g., using an audio or visual prompt) the contact center user to speak (or, alternatively, to display in front of the camera of the device of the contact center user) the information. For example, the contact center 400 may ask the user to speak their social security number, bank account number, and/or health insurance card number. The words spoken by the user may be automatically transcribed (e.g., using speech-to-text technology) and verified by the contact center 400. In some cases, the server uses text-to-speech technology to read back the entry to the user to confirm that the information was entered correctly. For example, the communication server might transmit audio to the device of the contact center user saying, "Your date of birth is Jan. 1, 1970. Press 1 if this is correct or press 2 if this is incorrect."

The contact center user may verify (e.g., by dialing a number in a telephone keypad, saying "yes," or selecting an icon in a graphical user interface) that the information was entered correctly. In response, the access to the media may be reenabled at the agent device 404, and the contact center user may continue the session with the contact center agent. The contact center user may be notified (e.g., via audio or via text or visual information in a graphical user interface of the communication session) of the re-enablement of the media access by the contact center agent.

In some cases, the contact center user may be unable to verify the information, for example, the contact center user may have an accent or a dialect that is not capable of being processed by the software and/or the hardware of contact center 400. In these circumstances, the media access from the user device 402 may be reenabled at the agent device 404 for manual verification of the information by the contact center agent. Alternatively, an additional contact center agent (who is authorized to access information, for example, due to having superior credentials, having passed a background check or having a security clearance) may be used to verify the information. The user device 402 may be connected to the device of the additional agent for verification of the information and, after the information is verified, the media access at the agent device 404 may be reenabled, and the additional contact center agent may be removed from the contact center engagement.

In some cases, the contact center user may have lost or forgotten the information, and may be unable to verify the information either via the automated engine or via the human contact center agent. In these cases, the contact center agent might attempt to verify the identity of the user in another way (e.g., by reviewing one or more government-issued identity documents) or the contact center user may only be permitted to access a limited set of services in the communication session since their identity could not be verified. For example, in a banking context, a user whose identity could not be verified might be able to ask general questions about account options available at the bank, but might not be able to apply for an account.

The implementations of this disclosure are described above by example in conjunction with voice or video calls between the user device 402 and the agent device 404 via the contact center 400. However, the implementations of this disclosure may also be applicable to a text messaging session between the contact center user and the contact center agent. The contact center user may be asked to type information for automatic verification by the contact center 400, and the typed information might not be presented to the contact center agent at the agent device 404. To notify the contact center user that the typed information is not to be presented to the contact center agent, a pop-up window or a different input region from the typical text messaging region may be used. Alternatively, the prompt for the information may be presented in a font, font size, or font dressing (e.g., bold, italicized, or underlined) that is different from the font, font size, or font dressing used by the contact center agent.

Furthermore, while the implementations are described herein in the context of a contact center, the disclosure is not limited to contact center implementations and may be used in other contexts. For example, if a caller claiming to be distant relative or social media contact calls (e.g., via voice call or video call or, alternatively, transmits a text message via a text messaging service) a person and asks the person for a favor, an identity verification server may be used to verify the identity of the caller and confirm, to the person, that the caller is or is not who they claim to be. The identity verification server use automated software to may ask the caller to provide their social security number, scan their driver's license, and/or answer questions based on their credit report (e.g., "At which bank do you have a mortgage?" or "On which street did you live on Feb. 1, 2019?").

In accordance with embodiments outside the contact center space, a communication server establishes a communication session between a first device and a second device. The communication server restricts access by the first device to media from the second device based on a request prompted to the second device during the communication session. The communication server reenables the access based on a verification of information obtained from the second device responsive to the request.

Figure 6:
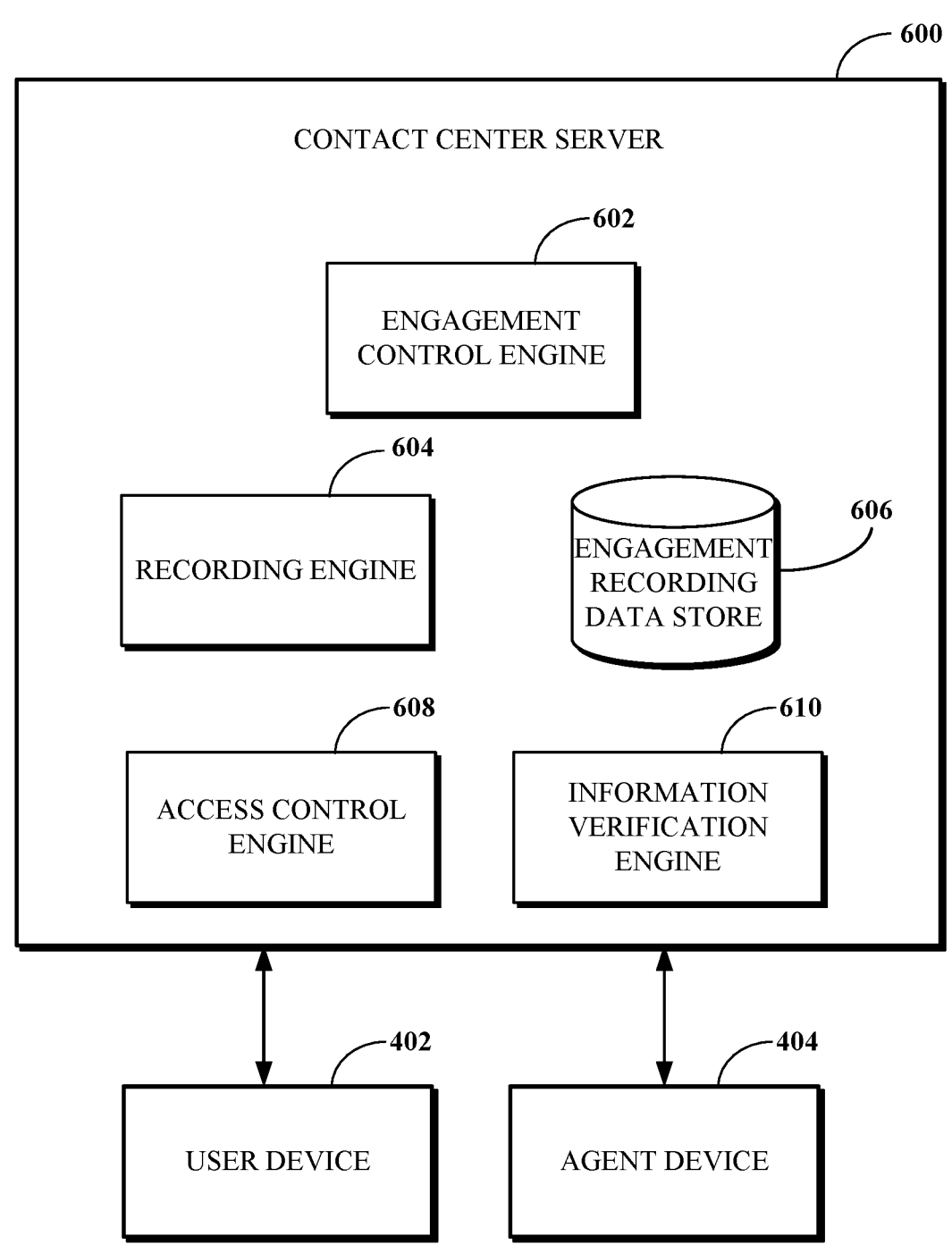
FIG. 6 is a block diagram of an example of a contact center server which may perform information verification.

FIG. 6 is a block diagram of an example of a contact center server 600 which may perform information verification. As shown, the contact center server 600 communicates with the user device 402 and with the agent device 404.

The contact center server 600 may correspond to the contact center 400. For example, the contact center server 600 may be a server used to implement the contact center 400. While the contact center server 600 is illustrated as being a single machine, the contact center server 600 may be implemented as multiple machines each of which performs all or a portion of the described functionalities. Alternatively, the contact center server 600 may be implemented as one or more virtual machines. As shown, the contact center server includes an engagement control engine 602, a recording engine 604, a engagement recording data store 606, an access control engine 608, and an information verification engine 610. Each of the engines 602, 604, 608, 610 may be implemented using software, hardware, or a combination of software and hardware. As shown, the engagement recording data store 606 resides in the contact center server.

Alternatively, the engagement recording data store 606 may be a database or other data store that is external to the contact center server 600.

The engagement control engine 602 is configured to control media associated with contact center engagements at the contact center server 600. The recording engine 604 is configured to generate recordings of the contact center engagements for storage in the engagement recording data store 606. The access control engine 608 controls access to media associated with the contact center engagements. The information verification engine 610 is configured to verify user information or a user identity. For example, the information verification engine 610 may be configured to verify at least one of an account number, a social security number, a health insurance card number, an identity card, an identity document, or a user identity based on questions from a user's credit history report, government records, or business records accessible to the contact center server 600.

According to some implementations, the user device 402 accesses (e.g., via a telephone network or via the Internet) the contact center server 600. Upon accessing the contact center server 600 the contact center user at the user device 402 is notified, via the engagement control engine 602, that the contact center engagement is to be recorded. The recording engine 604 records the contact center engagement and stores the recording in the session recording data store 606. The engagement control engine 602 adds the agent device 404 to the session, and the access control engine 608 grants access to all media associated with the contact center engagement to the agent device 404.

During the contact center engagement, the contact center agent may desire to verify information (e.g., a health insurance card number) of the contact center user. The contact center agent may select an icon on a graphical user interface at the agent device 404, for example, as illustrated in FIGS. 7A-B. The graphical user interface may be generated by the engagement control engine 602. In response, the access control engine 608 may restrict access, by the agent device 404, to media from the user device 402. The recording engine 604 may forego recording the media to which the access of the agent device 404 is restricted.

The information verification engine 610 may be used to verify the information. For example, the information verification engine 610 may request that the contact center user speak their health insurance card number or scan the health insurance card using the camera of the user device 402. If the user speaks the health insurance card number, the access control engine 608 may restrict access, by the agent device 404, to audio from the user device 402, while enabling access, by the agent device 404, to a visual output from the user device 402. If the user scans the health insurance card into the camera, the access control engine 608 may restrict access, by the agent device, to a visual output from the user device 402 while enabling access to the audio. In some implementations, the agent device 404 has access to requests provided to the user device 402 by the information verification engine 610 (but not to the contact center user's responses to the requests), and these requests are recorded by the recording engine 604. As a result, the contact center agent would know which information of the contact center user was verified by the information verification engine 610. For example, the contact center agent would know that the contact center user stated their social security number and showed their driver's license without having heard the social security number or seen the driver's license. Alternatively, the agent device 404 may lack access to requests provided to the user device 402 by the information verification engine 610, and these requests might not be recorded by the recording engine 604.

After the contact center user verifies the information, the access control engine reenables access, by the agent device 404, to media from the user device 402. The recording engine 604 continues recording the contact center engagement (including media received from the user device 402 and the agent device 404) for storage in the engagement recording data store. After the contact center engagement is terminated, (e.g., by the user device 402 or the agent device 404 terminating the contact center engagement, for example, by hanging up a phone or pressing an "end" button) the recording engine 604 stores the generated recording in the engagement recording data store 606.

Some implementations use various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software. An engine may include software, hardware, or a combination of software and hardware. In some cases, an engine includes software stored in a memory and processing hardware (e.g., one or more processors). The processing hardware executes instructions in the software.

In addition, an engine may itself be composed of more than one sub-engines, each of which may be regarded as an engine in its own right. Moreover, in some implementations, each of the various engines corresponds to a defined functionality. However, it should be understood that in other implementations, each functionality may be distributed to more than one engine. Likewise, in other implementations, multiple defined functionalities may be implemented by a single engine that performs those multiple functions, possibly alongside other functions, or distributed differently among a set of engines than specifically illustrated in the examples herein.

FIGS. 7A-B illustrate example graphical user interfaces 700A (in FIG. 7A), 700B (in FIG. 7B) for information verification. The graphical user interfaces 700A, 700B may be presented at the agent device 404 accessing a contact center engagement with a user device 402 via the contact center 400. The graphical user interfaces 700A, 700B may be generated by the engagement control engine 602 of the contact center server 600 and transmitted to the agent device 404 for display thereat.

During the contact center engagement, when the user device 402 connects to the agent device 404, the graphical user interface 700A is presented at the agent device 404. As shown, the graphical user interface 700A includes a visual output 702 (e.g., associated with a video call) from the user device 402, a verify info button 704 and call manager button 706. In alternative implementations, the contact center engagement is an audio call (e.g., a telephone call over the PSTN) and the visual output 702 is not provided. The verify info button 704, when selected (e.g., by touching a touch screen), causes the graphical user interface 700B of FIG. 7B to be presented at the agent device 404. The call manager button 706, when selected, contacts a device of a manager of the contact center agent to add the manager to the contact center engagement.

The graphical user interface 700B of FIG. 7B allows the contact center agent to select information to verify by selecting one of a driver's license button 708, a social security number button 710, and a health ID number button 712. In alternative implementations, the contact center server 600 may automatically determine which information to verify based on fixed rules (e.g., a contact center associated with a medical facility might verify the health ID number and the social security number of all contact center users) of based on a speech-to-text or other artificial intelligence analysis of the contact center engagement. For example, if the contact center agent says, "I need to verify your social security number," the contact center server 600 (e.g., via operation of the engagement control engine 602) may determine that the social security number is to be verified without presenting the graphical user interface 700B. Also, as shown, the graphical user interface 700B includes buttons 708, 710, 712 for selecting the information to be verified. In alternative implementations, at least one of radio buttons, check boxes, or a dropdown menu may be used instead of the illustrated buttons 708, 710, 712. In response to the selection, by the contact center agent using the agent device 404, of one of the buttons 708, 710, 712, the information verification engine 610 may be invoked to verify the information associated with the button without providing access to media associated with that information to the agent device 404. After the information is successfully verified (or the verification fails), a notification may be transmitted to the agent device 404 and the access of the agent device 404 to the media may be reenabled.

As illustrated in FIGS. 7A-B, the agent device 404 is a mobile phone. However, the agent device 404 is not limited to being a mobile phone. In alternative implementations, the agent device may be at least one of a laptop computer, a desktop computer, a tablet computer, or a wired telephone. If the agent device 404 is a laptop computer, a desktop computer or a tablet computer, the graphical user interfaces 700A, 700B may be configured for display thereon. If the agent device 404 is a wired telephone without a graphical display preset buttons on the telephone keypad may be used in place of the illustrated buttons 704, 706, 708, 710, 712. For example, the telephone keypad button "1" may be used in place of the button 704 and the telephone keypad button "2" may be used in place of the button 706. After selection of the telephone keypad button "1," (corresponding to the verify info button 704) the contact center agent may be asked (e.g., by an automated recording stored at the contact center server 600) which information should be verified, for example, contact center server may play, to the agent device 404, an audio recording saying, "Press 1 to verify the user's social security number, press 2 to verify the user's health ID number, or press 3 to verify both the user's social security number and the user's health ID number."

Figure 8:
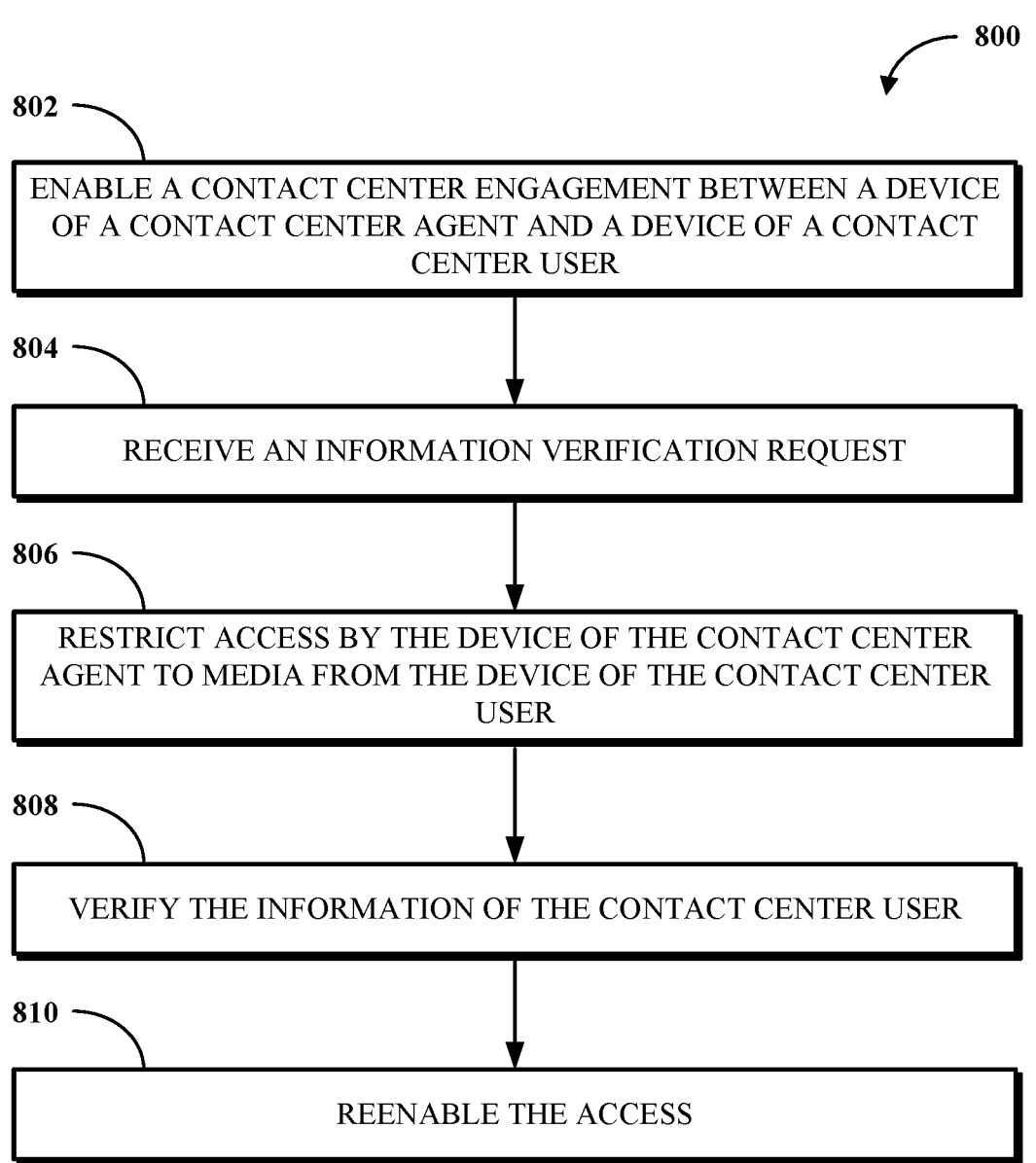
FIG. 8 is a flowchart of an example of a technique for restricting media access by contact center agents during a user verification process.

To further describe some implementations in greater detail, reference is next made to examples of techniques for restricting media access by contact center agents during a user verification process. FIG. 8 is a flowchart of an example of a technique 800 for restricting media access by contact center agents during a user verification process.

The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

As described above, FIG. 8 is a flowchart of an example of a technique 800 for restricting media access by contact center agents during a user verification process. The technique 800 may be implemented by a contact center, for example, the contact center server 600 or the contact center 400. Alternatively, the technique 800 may be implemented by any other computing device or combination of computing devices.

At 802, a contact center engagement between a device of a contact center agent (e.g., the agent device 404) and a device of a contact center user (e.g., the user device 402) is enabled. The contact center engagement may be enabled in response to the device of the contact center user being used to telephone the contact center or to communicate with the contact center via text messages, audio call, video call, or social media. Alternatively, a contact center (e.g., the contact center 400 or the contact center server 600) may contact the contact center user directly (e.g., to provide a special offer, verify a transaction, or speed up processing of a credit application).

At 804, an information verification request is received from the device of the contact center agent. For example, the contact center agent may press a button (e.g., a preset button on a telephone keypad or a button on a graphical user interface) corresponding to verifying the contact center user's identity by having the contact center user provide their social security number and answer multiple-choice questions based on their credit history report. For example, one of the multiple-choice questions may be, "On which of the following streets have you lived?—Press 1 for Washington Street, press 2 for Adams Street, press 3 for Jefferson Street, press 4 for none of the above."

At 806, access by the device of the contact center agent to media from the device of the contact center user is restricted based on a request prompted to the contact center user during the contact center engagement. For example, if the contact center user is asked to verbally state their information, audio from the device of the contact center user may be restricted from access by the device of the contact center agent. However, the device of the contact center agent may still be able to access other media (e.g., a visual output or text messages) from the device of the contact center user. Alternatively, if the contact center user is asked to place a document (e.g., a passport or a driver's license) in front of a camera of the device of the contact center user, the device of the contact center agent may be restricted from accessing the visual output while continuing to be able to access the audio output.

During the time that the access by the device of the contact center agent to media from the device of the contact center user is restricted, the device of the contact center user may still receive the media from the device of the contact center agent, so that the contact center user may know that the contact center agent is still working on their engagement. Alternatively, the device of the contact center user might not receive some or all of the media from the device of the contact center agent to make the contact center user have the impression that they are having a private session with the software or hardware of the contact center and without other people present.

In some implementations, the media for which the access by device of the contact center agent is restricted includes a first portion of visual output from the device of the contact center user. Access to audio output and a second portion of the visual output from the device of the contact center user is still enabled while the access to the first portion of the visual output is restricted. For example, the first portion of the visual output may be selectively blurred or greyed out based on object recognition processing performed against a video stream received from the device of the contact center user. For example, while the contact center user holds a document in front of the camera of the device of the contact center user, the video content corresponding to the document presented at the device of the contact center agent may be greyed or blurred out. Thus, the document may be read and verified automatically by the contact center but not by the device of the contact center agent. In some such implementations, the first portion of the visual output and the second portion of the visual output are obtained simultaneously from the device of the contact center.

At 808, the information of the contact center user is verified. For example, the contact center user may be asked to speak their address. The contact center may use speech-to-text or NLP technology to identify the address. The contact center may play the address back to the device of the contact center user and have the contact center user verify that the address was recorded correctly. For example, the contact center may play to the device of the contact center user, "I got your address as 123 Main Street, Beverly Hills, California. Is that correct?"

At 810, the access by the device of the contact center agent to media from the device of the contact center user is reenabled based on a verification of the information obtained from the device of the contact center user responsive to the request. For example, an indication that the information of the user was successfully verified without indicating the value of the information may be transmitted to the device of the contact center agent. For example, a recording stating, "the contact center user's address was verified," may be played to the device of the contact center agent without stating what the address is.

In some implementations, the contact center provides, to the device of the contact center agent or to the device of the contact center user, a notification that the access to the media is restricted upon restricting the access to the media. The contact center providing, to the device of the contact center agent or to the device of the contact center user, a notification that the access is reenabled upon reenabling the access. As a result, both the contact center user and the contact center agent know when the access is disabled and when the access is enabled, and are not surprised.

In some implementations, restricting the access by the device of the contact center agent to the media from the device of the contact center user based on the request prompted to the contact center user during the contact center engagement includes temporarily disconnecting the device of the contact center agent from the contact center engagement responsive to the request. After the information of the contact center user is verified, the device of the contact center agent may be reconnected to the contact center engagement.

In some implementations, the contact center records the contact center engagement, for example, for quality assurance or training purposes. However, the contact center may forego recording the media from the device of the contact center user to which the access is restricted. As a result, a person viewing the recording for quality assurance or training purposes would not have access to the restricted information of the contact center user.

Some implementations are described below as numbered examples (Example 1, 2, 3, etc.). These examples are provided as examples only and do not limit the other implementations disclosed herein.

Example 1 is a method, comprising: enabling a contact center engagement between a device of a contact center agent and a device of a contact center user; restricting access by the device of the contact center agent to media from the device of the contact center user based on a request prompted to the contact center user during the contact center engagement; and reenabling the access based on a verification of information obtained from the device of the contact center user responsive to the request.

In Example 2, the subject matter of Example 1 includes, wherein the media for which the access by device of the contact center agent is restricted comprises audio output from the device of the contact center user, wherein access to visual output from the device of the contact center user is still enabled while the access to the audio output is restricted.

In Example 3, the subject matter of Examples 1-2 includes, wherein the media for which the access by device of the contact center agent is restricted comprises visual output from the device of the contact center user, wherein access to audio output from the device of the contact center user is still enabled while the access to the visual output is restricted.

In Example 4, the subject matter of Examples 1-3 includes, wherein the media for which the access by device of the contact center agent is restricted comprises a first portion of visual output from the device of the contact center user, wherein access to audio output and a second portion of the visual output from the device of the contact center user is still enabled while the access to the first portion of the visual output is restricted, wherein the first portion of the visual output and the second portion of the visual output are obtained simultaneously.

In Example 5, the subject matter of Examples 1-4 includes, wherein the verification of information is completed automatically using a natural language processing engine.

In Example 6, the subject matter of Examples 1-5 includes, based on a failure of the verification of the information, enabling an engagement between the device of the contact center user and a device of a second contact center agent for manual verification of the information by the second contact center agent; and disabling the engagement between the device of the contact center user and the device of the second contact center agent responsive to the manual verification.

In Example 7, the subject matter of Examples 1-6 includes, providing, to the device of the contact center agent or to the device of the contact center user, a notification that the access to the media is restricted upon restricting the access to the media; and providing, to the device of the contact center agent or to the device of the contact center user, a notification that the access is reenabled upon reenabling the access.

In Example 8, the subject matter of Examples 1-7 includes, wherein restricting the access by the device of the contact center agent to the media from the device of the contact center user based on the request prompted to the contact center user during the contact center engagement comprises: temporarily disconnecting the device of the contact center agent from the contact center engagement responsive to the request.

In Example 9, the subject matter of Examples 1-8 includes, wherein the device of the contact center agent is temporarily disconnected from the contact center agent responsive to the request, and wherein reenabling the access based on the verification of the information obtained from the device of the contact center user responsive to the request comprises: reconnecting the device of the contact center agent to the contact center engagement based on the verification of the information.

In Example 10, the subject matter of Examples 1-9 includes, wherein the information obtained from the device of the contact center user is sensitive information subject to a privacy policy enforced for the contact center engagement.

In Example 11, the subject matter of Examples 1-10 includes, recording the contact center engagement by forgoing recording the media from the device of the contact center user to which the access is restricted.

Example 12 is a non-transitory computer readable medium storing instructions operable to cause one or more processors to perform operations comprising: enabling a contact center engagement between a device of a contact center agent and a device of a contact center user; restricting access by the device of the contact center agent to media from the device of the contact center user based on a request prompted to the contact center user during the contact center engagement; and reenabling the access based on a verification of information obtained from the device of the contact center user responsive to the request.

In Example 13, the subject matter of Example 12 includes, wherein the media for which the access by device of the contact center agent is restricted comprises audio output and visual output from the device of the contact center user, wherein access to text messages from the device of the contact center user is still enabled while the access to the audio output and the visual output is restricted.

In Example 14, the subject matter of Examples 12-13 includes, wherein the verification of information is completed automatically using an artificial intelligence engine trained for the verification of the information.

In Example 15, the subject matter of Examples 12-14 includes, the operations comprising: playing back, to the device of the contact center user, the information obtained responsive to the request to verify that the information is correctly obtained; and receiving, from the device of the contact center user, an indication that the information is correctly obtained responsive to playing back of the information.

In Example 16, the subject matter of Examples 12-15 includes, the operations comprising: based on a failure of the verification of the information, enabling an engagement between the device of the contact center user and a device of a second contact center agent for manual verification of the information by the second contact center agent; and disabling the engagement between the device of the contact center user and the device of the second contact center agent responsive to the manual verification.

In Example 17, the subject matter of Examples 12-16 includes, the operations comprising: based on a failure of the verification of the information, reenabling the access for manual verification of the information by the contact center agent.

Example 18 is an apparatus, comprising: a memory; and a processor configured to execute instructions stored in the memory to: enable a contact center engagement between a device of a contact center agent and a device of a contact center user; restrict access by the device of the contact center agent to media from the device of the contact center user based on a request prompted to the contact center user during the contact center engagement; and reenable the access based on a verification of information obtained from the device of the contact center user responsive to the request.

In Example 19, the subject matter of Example 18 includes, wherein the media from the device of the contact center user which corresponds to the information obtained from the device of the contact center user is first media, wherein the processor is configured to execute the instructions stored in the memory to: store, in a data repository, a recording of the contact center engagement, wherein the recording omits the media from the device of the contact center user to which the access is restricted.

In Example 20, the subject matter of Examples 18-19 includes, wherein the verification of information is completed automatically by the apparatus and without providing access to the information to a person different from the contact center user.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method implemented by a contact center server, comprising:

enabling a contact center engagement between a device of a contact center agent and a device of a contact center user;

restricting access by the device of the contact center agent to a first type of media from the device of the contact center user based on a request prompted to the contact center user during the contact center engagement, wherein the device of the contact center agent continues to have access to a second type of media from the device of the contact center user while access to the first type of media is restricted, wherein the first type being video data and the second type being audio data, and wherein restricting the access by the device of the contact center agent to the first type of media from the device of the contact center user comprises:

determining that the request prompted to the contact center user involves obtaining visual information using a camera of the device of the contact center user;

continuing a flow of a second stream of the second type of media between the device of the contact center agent and the device of the contact center user;

receiving a first stream of the first type of media from the device of the contact center user;

processing, to obtain a processed first stream, the first stream by selectively blurring or greying only the visual information in the first stream while transmitting portions that do not depict the visual information without blurring or greying out, wherein the processing is performed during the contact center engagement to prevent the contact center agent from viewing the visual information; and transmitting the processed first stream to the device of the contact center agent; and reenabling the access based on a verification of information obtained from the device of the contact center user responsive to the request.

2. The method of claim 1, wherein the media for which the access by device of the contact center agent is restricted comprises an audio output from the device of the contact center user, wherein access to visual output from the device of the contact center user is still enabled while the access to the audio output is restricted.

3. The method of claim 1, wherein the media for which the access by device of the contact center agent is restricted comprises a visual output from the device of the contact center user, wherein access to audio output from the device of the contact center user is still enabled while the access to the visual output is restricted.

4. The method of claim 1, wherein the first type of media for which the access by device of the contact center agent is restricted comprises a first portion of visual output from the device of the contact center user, wherein access to audio output and a second portion of the visual output from the device of the contact center user is still enabled while the access to the first portion of the visual output is restricted, wherein the first portion of the visual output and the second portion of the visual output are obtained simultaneously.

5. The method of claim 1, wherein the verification of information is completed automatically using a natural language processing engine.

6. The method of claim 1, comprising:

based on a failure of the verification of the information, enabling an engagement between the device of the contact center user and a device of a second contact center agent for manual verification of the information by the second contact center agent; and disabling the engagement between the device of the contact center user and the device of the second contact center agent responsive to the manual verification.

7. The method of claim 1, comprising:

providing, to the device of the contact center agent or to the device of the contact center user, a notification that the access to the media is restricted upon restricting the access to the media; and providing, to the device of the contact center agent or to the device of the contact center user, a notification that the access is reenabled upon reenabling the access.

8. The method of claim 1, wherein restricting the access by the device of the contact center agent to the media from the device of the contact center user based on the request prompted to the contact center user during the contact center engagement comprises:

temporarily disconnecting the device of the contact center agent from the contact center engagement responsive to the request.

9. The method of claim 1, wherein the device of the contact center agent is temporarily disconnected from the contact center agent responsive to the request, and wherein reenabling the access based on the verification of the information obtained from the device of the contact center user responsive to the request comprises:

reconnecting the device of the contact center agent to the contact center engagement based on the verification of the information.

10. The method of claim 1, wherein the information obtained from the device of the contact center user is sensitive information subject to a privacy policy enforced for the contact center engagement.

11. The method of claim 1, comprising:

recording the contact center engagement by forgoing recording the media from the device of the contact center user to which the access is restricted.

12. A non-transitory computer readable medium storing instructions operable to cause one or more processors of a conferencing server to perform operations comprising:

enabling a contact center engagement between a device of a contact center agent and a device of a contact center user;

restricting access by the device of the contact center agent to a first type of media from the device of the contact center user based on a request prompted to the contact center user during the contact center engagement, wherein the device of the contact center agent continues to have access to a second type of media from the device of the contact center user while access to the first type of media is restricted, wherein the first type being video data and the second type being audio data, and wherein restricting the access by the device of the contact center agent to the first type of media from the device of the contact center user comprises:

determining that the request prompted to the contact center user involves obtaining visual information using a camera of the device of the contact center user;

continuing a flow of a second stream of the second type of media between the device of the contact center agent and the device of the contact center user;

receiving a first stream of the first type of media from the device of the contact center user;

processing, to obtain a processed first stream, the first stream by selectively blurring or greying only the visual information in the first stream while transmitting portions that do not depict the visual information without blurring or greying out, wherein the processing is performed during the contact center engagement to prevent the contact center agent from viewing the visual information; and transmitting the processed first stream to the device of the contact center agent; and reenabling the access based on a verification of information obtained from the device of the contact center user responsive to the request.

13. The non-transitory computer readable medium of claim 12, wherein the media for which the access by device of the contact center agent is restricted comprises an audio output and visual output from the device of the contact center user, wherein access to text messages from the device of the contact center user is still enabled while the access to the audio output and the visual output is restricted.

14. The non-transitory computer readable medium of claim 12, wherein the verification of information is completed automatically using an artificial intelligence engine trained for the verification of the information.

15. The non-transitory computer readable medium of claim 12, the operations comprising:

playing back, to the device of the contact center user, the information obtained responsive to the request to verify that the information is correctly obtained; and receiving, from the device of the contact center user, an indication that the information is correctly obtained responsive to playing back of the information.

16. The non-transitory computer readable medium of claim 12, the operations comprising:

based on a failure of the verification of the information, enabling an engagement between the device of the contact center user and a device of a second contact center agent for manual verification of the information by the second contact center agent; and disabling the engagement between the device of the contact center user and the device of the second contact center agent responsive to the manual verification.

17. The non-transitory computer readable medium of claim 12, the operations comprising:

based on a failure of the verification of the information, reenabling the access for manual verification of the information by the contact center agent.

18. An apparatus, comprising:

a memory; and a processor configured to execute instructions stored in the memory to:

enable a contact center engagement between a device of a contact center agent and a device of a contact center user;

restrict access by the device of the contact center agent to a first type of media from the device of the contact center user based on a request prompted to the contact center user during the contact center engagement, wherein the device of the contact center agent continues to have access to a second type of media from the device of the contact center user while access to the first type of media is restricted, wherein the first type being video data and the second type being audio data, and wherein to restrict the access by the device of the contact center agent to the first type of media from the device of the contact center user comprises to:

determine that the request prompted to the contact center user involves obtaining visual information using a camera of the device of the contact center user;

continue a flow of a second stream of the second type of media between the device of the contact center agent and the device of the contact center user;

receive a first stream of the first type of media from the device of the contact center user;

process, to obtain a processed first stream, the first stream by selectively blurring or greying only the visual information in the first stream while transmitting portions that do not depict the visual information without blurring or greying out, wherein the processing is performed during the contact center engagement to prevent the contact center agent from viewing the visual information; and transmit the processed first stream to the device of the contact center agent; and reenable the access based on a verification of information obtained from the device of the contact center user responsive to the request.

19. The apparatus of claim 18, wherein the media from the device of the contact center user which corresponds to the information obtained from the device of the contact center user is first media, wherein the processor is configured to execute the instructions stored in the memory to:

generate a recording of the contact center engagement, wherein the recording omits the first media.

20. The apparatus of claim 18, wherein the verification of the information is automatically performed upon receiving the information from the device of the contact center user and without providing access to the information to a person different from the contact center user.

* * * * *